(12) United States Patent
Resing et al.

(10) Patent No.: US 7,237,373 B2
(45) Date of Patent: Jul. 3, 2007

(54) STALK ROLL WITH OPPOSITELY TAPERING BODY AND DRIVERS

(75) Inventors: Alfons Resing, Stadtlohn (DE); Clemens Rickert, Stadtlohn (DE)

(73) Assignee: Maschinenfabrik Kemper GmbH & Co. KG, Breul, Stadtlohn (DE)

( * ) Notice: Subject to any disclaimer, the term of this patent is extended or adjusted under 35 U.S.C. 154(b) by 0 days.

(21) Appl. No.: 10/691,213

(22) Filed: Oct. 22, 2003

(65) Prior Publication Data

US 2004/0123577 A1 Jul. 1, 2004

(30) Foreign Application Priority Data

Oct. 29, 2002 (DE) ................ 102 50 338

(51) Int. Cl.
*A01D 45/02* (2006.01)

(52) U.S. Cl. ........................................ 56/104

(58) Field of Classification Search .................. 56/104, 56/60, 94, 114, 500, 119, 66, 59, 105
See application file for complete search history.

(56) References Cited

U.S. PATENT DOCUMENTS

| | | | | |
|---|---|---|---|---|
| 799,845 | A * | 9/1905 | Goodhue | 56/104 |
| 839,472 | A * | 12/1906 | Goodhue | 460/27 |
| 1,641,436 | A | 9/1927 | Jett | |
| 1,764,686 | A * | 6/1930 | Kuhlman | 460/27 |
| 1,827,216 | A | 10/1931 | Henry | |
| 2,180,594 | A | 11/1939 | Kuhlman | |
| 2,490,715 | A | 12/1949 | Shrader | |
| 2,538,965 | A * | 1/1951 | Fergason | 460/27 |
| 2,569,175 | A | 9/1951 | Karlsson | |
| 2,604,750 | A * | 7/1952 | Fergason | 56/104 |
| 2,821,058 | A * | 1/1958 | Jones | 56/108 |
| 2,870,593 | A | 1/1959 | Anderson | 56/104 |
| 2,905,181 | A * | 9/1959 | Nelson | 460/27 |
| 3,462,928 | A * | 8/1969 | Schreiner et al. | 56/104 |
| 3,832,836 | A | 9/1974 | Anderson | 56/104 |
| 3,858,384 | A * | 1/1975 | Maistee et al. | 56/14.2 |
| 4,219,990 | A | 9/1980 | Hill | 56/14.2 |
| 4,377,062 | A | 3/1983 | Slattery | 56/14.3 |
| 5,009,061 | A * | 4/1991 | Heuling | 56/104 |
| 5,040,361 | A * | 8/1991 | Briesemeister | 56/52 |
| 5,404,699 | A * | 4/1995 | Christensen et al. | 56/104 |
| 6,050,071 | A * | 4/2000 | Bich et al. | 56/52 |
| 6,412,259 | B1 * | 7/2002 | Wiegert | 56/60 |

FOREIGN PATENT DOCUMENTS

DE    1 757 213    2/1970

(Continued)

*Primary Examiner*—Árpád Fábián Kovács

(57) ABSTRACT

A stalk roll for a harvesting device for harvesting crop heads of stalk-like plants. The stalk roll is provided with a roll body having projecting drivers distributed around its periphery. The pull-in speed of the stalk rolls in a picking region where the crop heads are removed is less than in a region of the stalk rolls situated farther downstream after the crop head has been removed. The diameter of the roll body in the picking region is greater than in the region situated farther downstream. In addition, it is proposed that upstream of a picking region the stalk roll have an inlet region which cooperates with the parts of the plants beneath the crop heads, where the pull-in speed of the stalk roll is greater than in the picking region.

7 Claims, 6 Drawing Sheets

FOREIGN PATENT DOCUMENTS

| | | |
|---|---|---|
| DE | 2313519 | 10/1973 |
| DE | 30 13 689 | 10/1980 |
| DE | 197 30 912 C2 | 1/1999 |
| DE | 299 09 358 U1 | 11/2000 |
| EP | 0 369 440 | 5/1990 |
| EP | 0 943 229 A1 | 9/1999 |

* cited by examiner

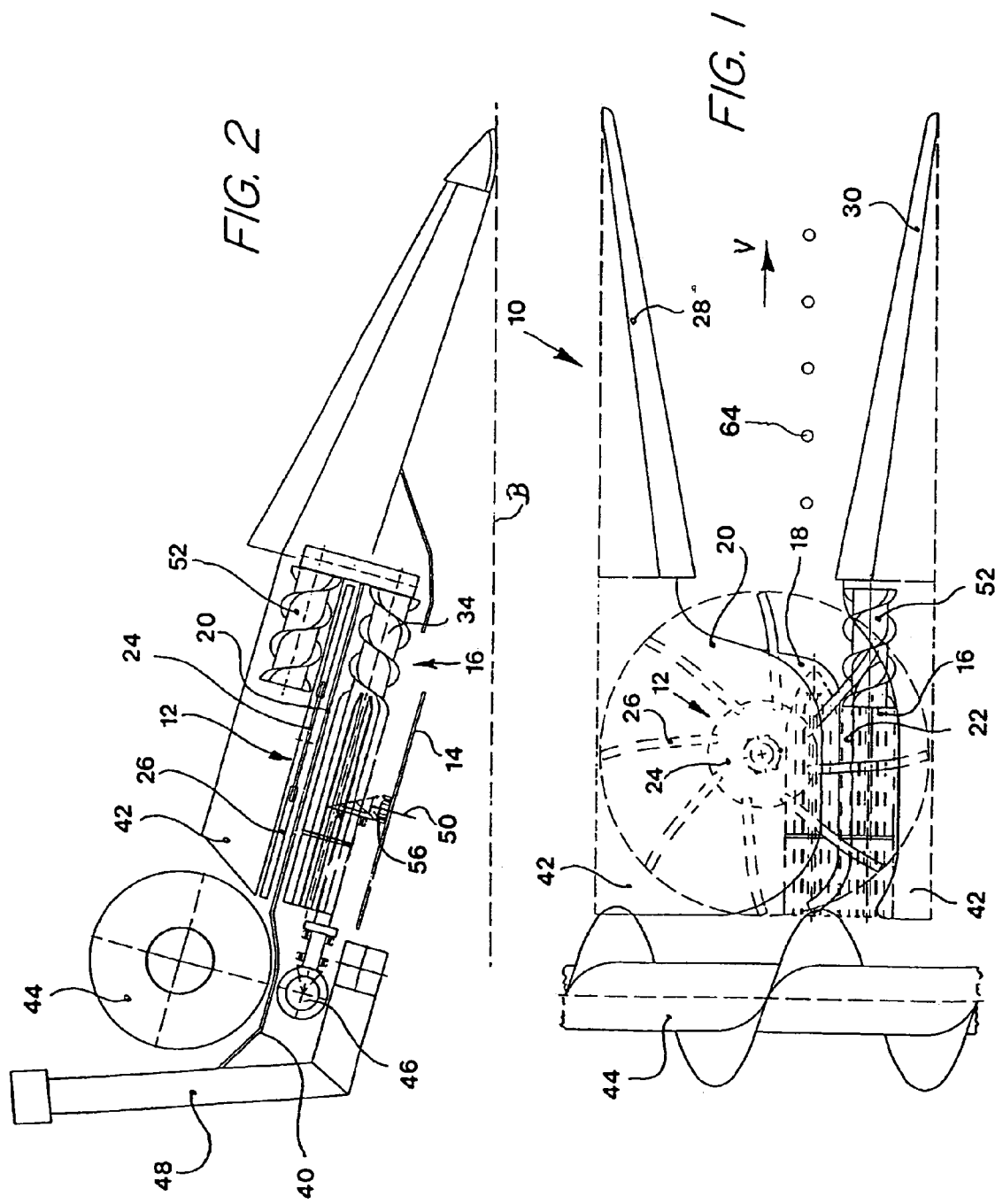

STALK ROLL WITH OPPOSITELY TAPERING BODY AND DRIVERS

FIELD OF THE INVENTION

The present invention is directed to a stalk roll, for a harvesting machine for harvesting crop heads of stalk-like plants, with a roll body and projecting drivers distributed around its periphery.

BACKGROUND OF THE INVENTION

Pickers are used in agricultural harvesting, in order to separate the crop heads of plants from the other parts of the plants. Such pickers generally have two stalk rolls, between which the plant stalk is pulled in. Occasionally, only one stalk roll is used, which cooperates with a fixed wall. The stalk roll or rolls pulls or pull the plant through a picking gap whose dimensions are narrower than that of the crop head. Because of this, the crop head, for example, an ear of corn, is separated from the rest of the plant and can be processed separately. The stalk rolls are often provided with drivers, mounted on a tubular base element, that extend over their length.

The cylindrical stalk rolls may be provided with forward mounted conical tips provided with helical vanes to pull in the plant, as disclosed in U.S. Pat. No. 4,377,062. In addition, conical stalk rolls have been disclosed, for example, in U.S. Pat. No. 2,870,593, U.S. Pat. No. 3,832,836, DE 1 757 213 A, DE 2 313 519 A, DE 197 30 912 A and EP 0 943 229 A. With these conical stalk rolls their envelopes have a smaller diameter at their front end, in the direction of travel, than at their rear end. Because of this, a situation is achieved in which the plants are pulled in at a relatively slower speed in their lower region, which cooperates with the front sections of the stalk roll that have a smaller diameter. The upper, thinner parts of the plant are pulled in with a relatively higher speed by the rear head region of the stalk rolls that have a larger diameter. Because of this, the cob, which generally grows on the lower part of the plant, is supposed to be pulled in relatively slowly during stripping in the picking gap, and is therefore handled gently, whereas the upper, thin part of the stalk is pulled in rapidly.

In the last two documents mentioned, it is proposed that the axes of the cooperating stalk rolls converge, so that the gap remaining between the stalk rolls can remain a constant width over its length. A picker with conical stalk rolls is also shown in U.S. Pat. No. 1,641,436, whose axes converge so that the width of the gap between the stalk rolls is constant over its length. However, the stalk rolls are thicker at the front, lower end than at the upper, rear head end.

It is considered a shortcoming in pickers with conical stalk rolls that, with parallel stalk rolls, the spacing between the cooperating stalk rolls diminishes progressively to the rear head, leading to crushing of the plant stalks in the rear head region that increases the required drive power, and that the conicity is limited for mechanical-spatial reasons, while in stalk rolls with converging axes, expensive and elaborate angle gear head mechanisms are required. Pickers with cylindrical stalk rolls, unlike those with conical stalk rolls, do not have the advantage of pulling in of the plant that accelerates over the length of the stalk rolls.

SUMMARY OF THE INVENTION

It is an object of the present invention to provide a stalk roll that is improved relative to the prior art.

The diameter of the roll body varies over the length of the stalk roll, and that complementary to this, i.e., in the opposite manner, the distance of the outer edges of the drivers from the roll body changes.

If the roll body therefore tapers in the direction of flow of the harvested crop, the distance of the drivers from the roll body increases. Conversely, the distance of the drivers from the roll body would diminish were the diameter of the roll body to widen. Since the envelope circle described by the outer edges of the driver defines the pull-in speed of the stalk roll, an additional degree of freedom is created for obtaining the desired progression of pull-in speed over the length of the stalk roll.

It is also proposed that the roll body have a smaller diameter, especially in a picking region of the stalk rolls where the stalk roll cooperates with the parts of the plants carrying the crop head, and where the plants are pulled in relatively slowly in order to strip off the crop heads gently, than in a downstream region of the stalk roll that pulls in the parts of the plants situated above the crop heads.

In this manner, a situation is achieved even the stalk rolls with greater conicity can also be arranged parallel to each other, since the drivers of one stalk roll can enter the space left free by the tapered roll body of the other stalk roll. The drivers of the one stalk roll force the upper parts of the plants against the roll body of the other stalk roll, which causes an increase in the pull-in speed in the region of the stalk roll that pulls in the upper parts of the plants relative to the picking region of the stalk roll.

The roll body, especially between the picking region and the region situated downstream from it where the upper parts of the plants are pulled in, can be configured as a truncated cone or in some other continuously varying manner. Because of this, one obtains continuous tapering of the roll body. If the drivers are configured conically in complementary fashion for this, i.e., the envelope circle diameter of the outer edges of the drivers widens continuously, a continuous, especially linear, head increase in pull-in speed is obtained.

A step-like tapering of the roll body, which can have manufacturing advantages, is also conceivable. Similarly, the drivers would then widen outward in step-like fashion. Step-like and conical taperings of the roll body can also be combined.

Generally, the crop heads of plants grow at a certain height that can range upward from 1 meter. It would be advantageous for the parts of the plants lying beneath it to be pulled in relatively quickly, in order to increase the operating speed. As an alternative, it is proposed to provide an inlet region, upstream of the picking region of the stalk roll, where the pull-in speed of the stalk roll is greater than in the picking region. Therefore, the inlet region advantageously has a roll body whose diameter is reduced relative to the roll body in the picking region. Similarly, the enveloping circle diameter of the driver is greater in the inlet region than in the picking region.

BRIEF DESCRIPTION OF THE DRAWINGS

FIG. 1 is a top view of a gathering and picking device of a harvesting machine with stalk rolls, according to a first embodiment.

FIG. 2 is a side view of the gathering and picking device from FIG. 1.

DETAILED DESCRIPTION

Figure 3:
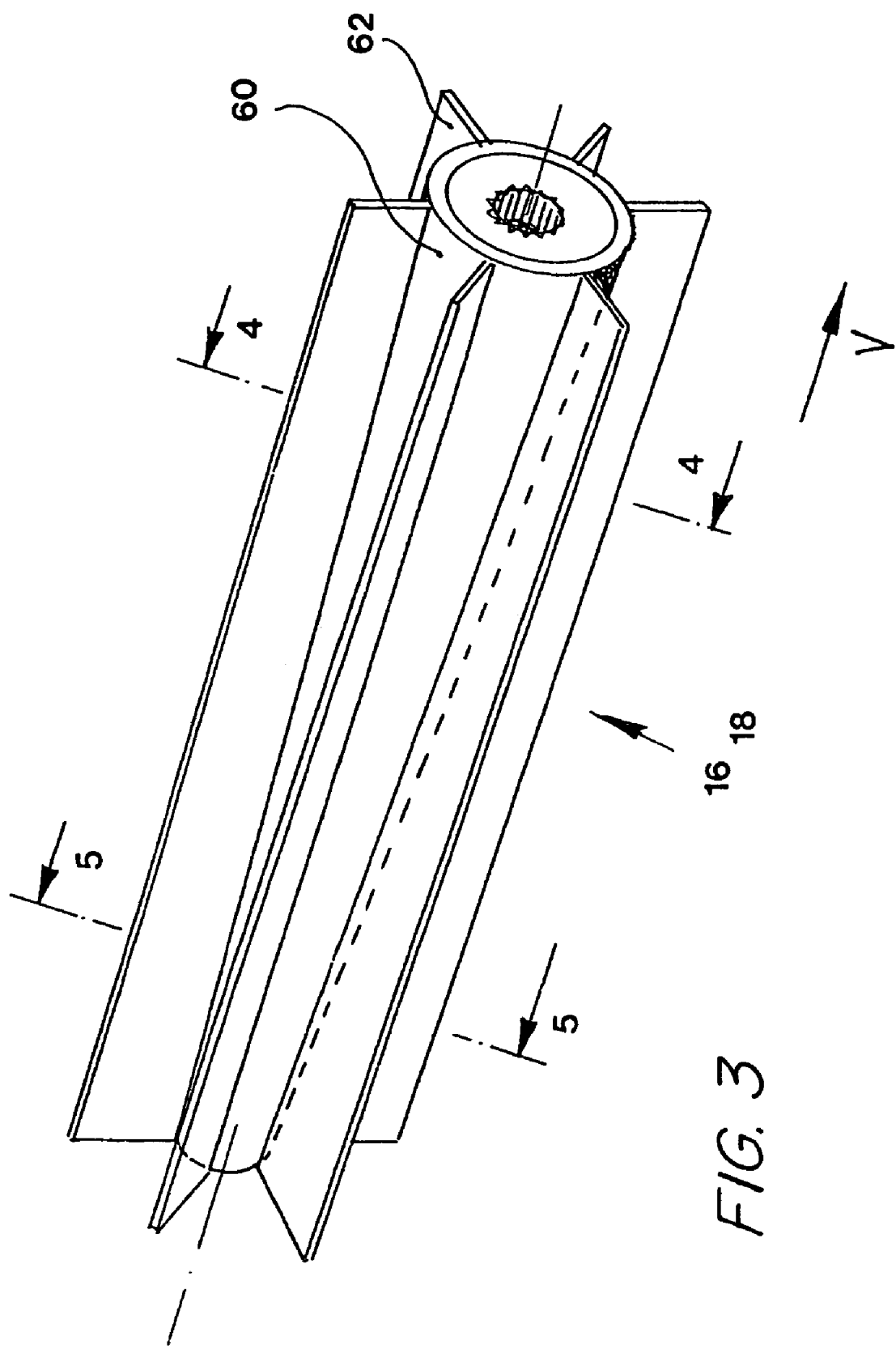
FIG. 3 is a perspective view of a first embodiment of the stalk rolls.

In FIG. 1, a gathering assembly and picking device 10 of a harvesting assembly has a gathering element 12 that serves to grasp and gather the plant being harvested, a rotating chopping blade 14, and a first stalk roll 16 and a second stalk roll 18 that are arranged beneath a picking gap 22 formed in a stripper plate 20.

The upper gathering element 12 is rotatably arranged around a roughly vertical axis and is placed in rotation, clockwise in FIG. 1 by a suitable drive. The gathering element 12 is arranged above the stripper plate 20 and has a rotational axis that is sloped slightly forward. The gathering element 12, in its basic design, comprises a central disk 24 with fingers 26, extending essentially radially and distributed over its periphery. The fingers 26 are curved in the plane of disk 24 opposite the direction of rotation, i.e., trailing. Stalk dividers 28 and 30 are arranged in front of the gathering element 12 in the forward direction of movement V of the harvesting assembly. The leading edge of the stripper plate 20 in the forward direction of movement is also curved, so that the stalks of plant 64 are forced into the working region of the gathering element 12.

The method of action of the gathering element 12 is readily apparent from FIG. 1. A stalk of a plant 64 standing in the field makes contact with a finger 26 of gathering element 12 after it has optionally been bent by the stalk divider 28 or 30 and/or the leading edge of the stripper plate 20 in the direction toward the picking gap 22. The stalk is entrained by the leading surface of finger 26 and forced outward because of the trailing curvature of finger 26. In this manner, the stalk of plant 64 is transported by finger 26 into picking gap 22 defined by the stripper plate 20. The picking gap 22 extends at least roughly parallel to the forward direction of movement V.

The first stalk roll 16 is arranged next to the gathering element 12 and sloped slightly forward and downward. When viewed in the lateral direction, it is oriented parallel to the forward direction of movement V. In the front region, lying upstream, relative to the direction of movement of plant 64, the first stalk roll 16 is provided with a screw conveyor 34 that pulls in the stalks of plant 64 into picking gap 22 in cooperation with the gathering element 12.

A conveyor element in the form of a screw conveyor 52 is arranged above the end of the picking gap 22 and the gathering element 12. By cooperation of the two feed screws 34 and 52 and finger 26, the plant 64 is reliably secured and guided linearly into the picking gap 22 and between stalk rolls 16 and 18.

The stalks of plant 64 enter the effective picking region of the second stalk roll 18, whose front tip (relative to the forward direction of movement V) also lies in front of the rotational axis of the gathering element 12. The second stalk roll 18 is oriented parallel to the first stalk roll 16 and is arranged between the latter and the rotational axis of the gathering element 12, wherein the gap defined between the first stalk roll 16 and the second stalk roll 18 is arranged directly beneath the picking gap 22. The first stalk roll 16 and the second stalk roll 18 are provided over their entire length in known fashion with axially running, outwardly projecting drivers 62, as are most apparent in FIG. 3. The axes of the stalk rolls 16 and 18 run parallel to each other. The second stalk roll 18 and the first stalk roll 16 pull in the stalk of plant 64 downward (see FIG. 4). The stripper plate 20 on both sides of the picking gap 22 serves to strip the crop heads 66 from plant 64.

The crop heads 66 of plant 64, like ears of corn, multiple fruit heads of sunflowers, etc., separated by the picking device are conveyed by the gathering element 12 into a trough 40 arranged at the back of the gathering and picking device 10. A cover 42 on both sides of the picking gap 22 defines a channel leading to trough 40 through which the crop heads of plant 64 are conveyed. A feed screw 44, oriented transverse to the forward direction of travel and arranged above trough 40, transports the crop heads to a harvesting vehicle (for example, a combine or forage harvester) or to a trailer. A shaft 46 that serves to drive the two stalk rolls 16 and 18, the chopping blade 14, the feed screw 52 and the gathering element 12 of the gathering and picking devices 10 is located beneath trough 40. The shaft 46 is drivingly connected to the motor of a vehicle carrying the harvesting assembly. A frame 48 carries the gathering and picking devices 10 of the harvesting assembly, all of which are driven by shaft 46.

The residues of plant 64, which are transported away downward by the stalk rolls 16 and 18, enter the working region of the rotating, four-armed chopper blade 14 and are chopped by this into individual pieces. The chopping blade 14 rotates in a vertical rotational axis 50 that relative to the forward direction of travel V is arranged between the rotational axis of the gathering element 12 and the feed screw 44, and is driven by the shaft 46 via a gear head mechanism 56.

One of the stalk rolls 16 and 18 according to the invention is shown in an perspective view in FIG. 3. It comprises a hollow roll body 60 and drivers 62, distributed uniformly on its periphery, extending radially relative to its longitudinal and rotational axis. The roll body 60 is in the form of a truncated cone (conical), wherein it has a larger diameter at its front end, in the forward direction of travel V, than at its rear head end. In addition, the outside diameter of the enveloping circle described by the outer edges of the drivers 62 enlarges linearly from the front to the rear head end of stalk rolls 16 and 18. The enveloping circle of stalk rolls 16 and 18 is therefore conical and has its largest diameter at the rear head downstream end. The stalk rolls 16 and 18 are driven synchronously (at the same speed), and their drivers 62 are symmetrically offset at an angle relative to each other. The drivers 62 of one stalk roll 16 or 18 enter in known fashion into the enveloping circle of the drivers 62 of the other stalk roll 18 or 16 (see FIGS. 4 and 5). As described above, plants are conveyed by a finger 26 of the gathering element 12 along the length of the picking gap 22 and the stalk rolls 16 and 18. Because of the conicity of the stalk rolls 16 and 18, their pull-in speed increases continuously as the plants are conveyed farther along the length of the stalk rolls 16 and 18. Despite the parallel arrangement of the axes of the stalk rolls 16 and 18, the roll bodies 60, tapering in the direction of flow, permit increased conicity relative to the prior art and a spacing of constant size, over the length of stalk rolls 16 and 18, between the roll bodies 60 of one stalk roll 16 and 18 from the drivers 62 of the other stalk roll 18 and 16.

Figure 4:
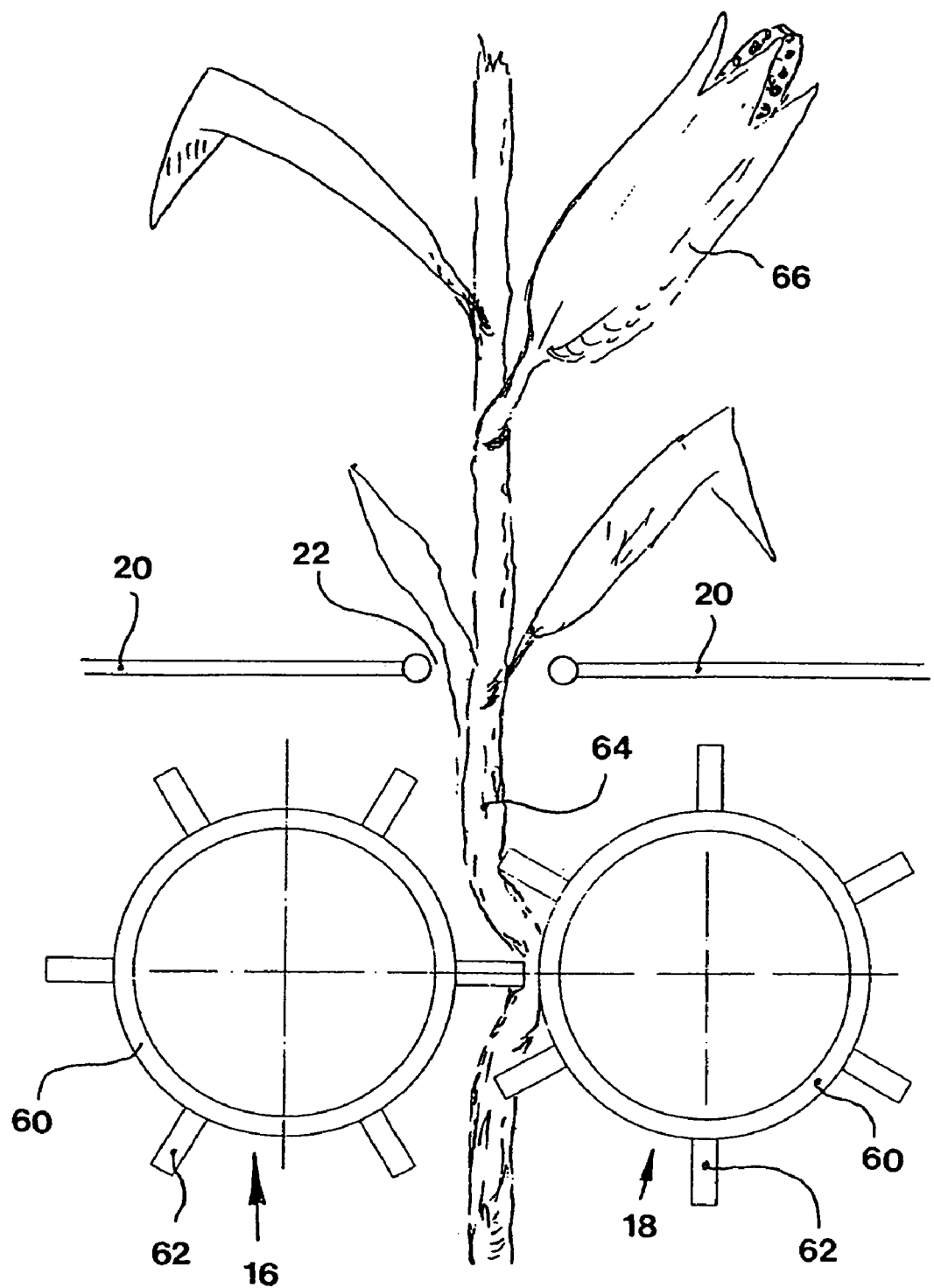
FIG. 4 is a cross sectional view through two stalk rolls, in along line 4—4 from FIG. 3 during a harvesting operation.

FIG. 4 shows a section through the stalk rolls 16 and 18 along line 4—4 of FIG. 3. A plant 64 is situated in the picking gap 22 and its crop heads 66 (ears) are above the picking gap. The picking region of the stalk rolls 16 and 18 begins roughly at line 4—4, where the parts of the plants 64 carrying the crop heads are pulled in by the stalk rolls 16 and 18. The diameter of the roll bodies 60 of stalk rolls 16 and 18 is relatively large at this location, while the separation of the outer edges of the drivers 62 from the roll bodies 60 is quite limited. The plant 64 is bent by the drivers 62 only slightly to the side and forced against the roll bodies 60 of the other stalk roll 18. The plant 64, because of the relatively limited diameter of the driver 62 and the limited lateral bending of the plant 64, is pulled in relatively slowly, so that the crop heads 66 are picked gently.

Figure 5:
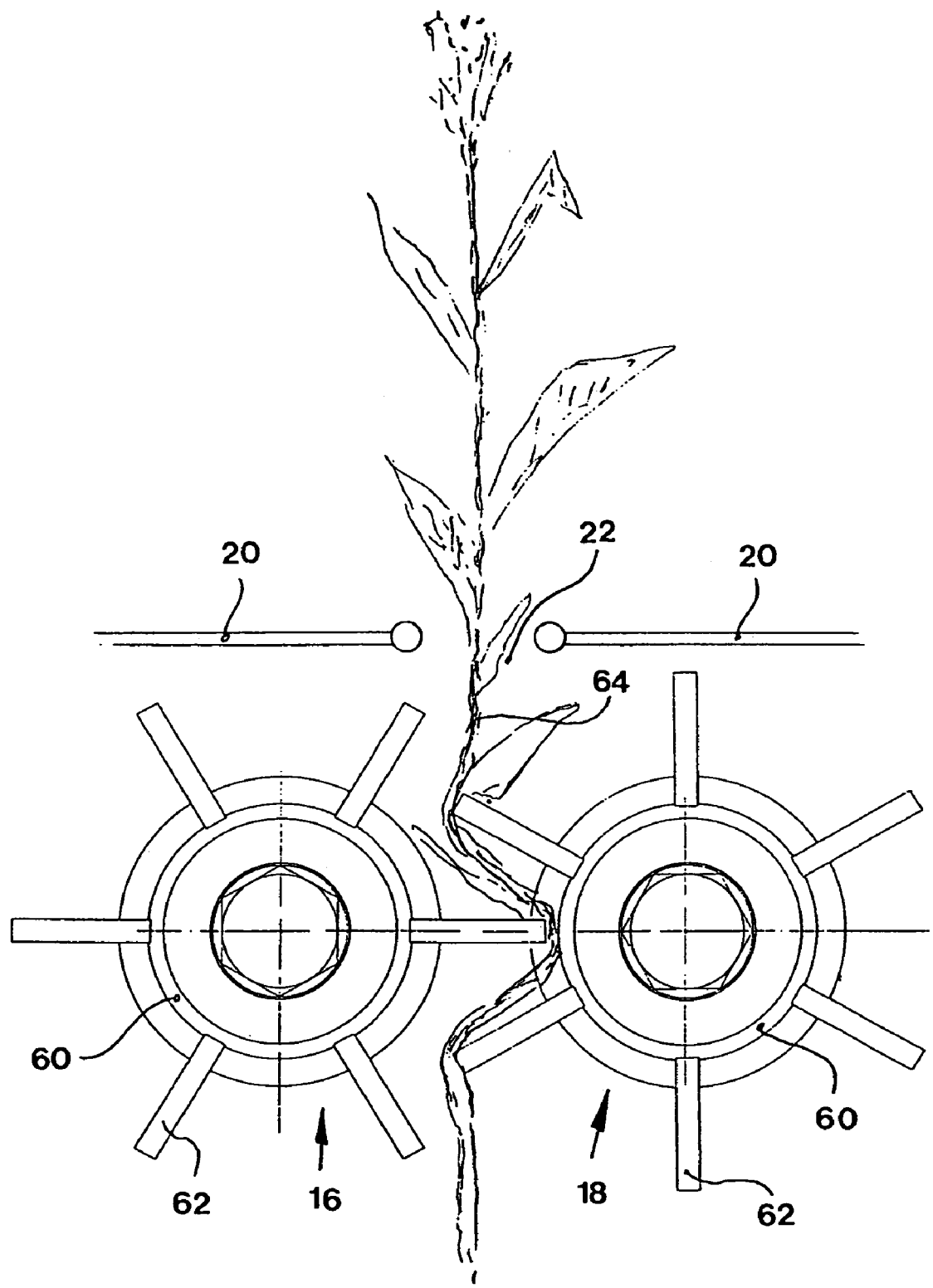
FIG. 5 is a cross sectional view through two stalk rolls in along line 5—5 from FIG. 3 during a harvesting operation.

FIG. 5 shows a section through the stalk rolls 16 and 18 along line 5—5, which is situated downstream of the picking region of stalk rolls 16 and 18, and where the outer diameter of the roll bodies 60 along line 4—4 is shown. In this region, downstream from the picking region, the parts of the plant 64 carrying the crop heads 66 have already been pulled through the picking gap 22. The diameter of the roll bodies 60 at this location is relatively small, while the separation of the outer edges of the drivers 62 from the roll bodies 60 and the enveloping circle diameter of the outer edges of the drivers 62 are relatively large. The plant 64 is bent quite far to the side by the drivers 62 and is forced against the roll body 60 of the other stalk roll 18. Because of the diameter of the enveloping circle of the outer edges of the drivers 62, which is greater here than in the picking region, and owing to bending of the plant 64 to the side, the plant is pulled in much more quickly than in the picking region. Because of this, the picking gap 22 is freed-up again relatively quickly without the crop heads 66 being damaged by the fairly high pull-in speed.

Figure 6:
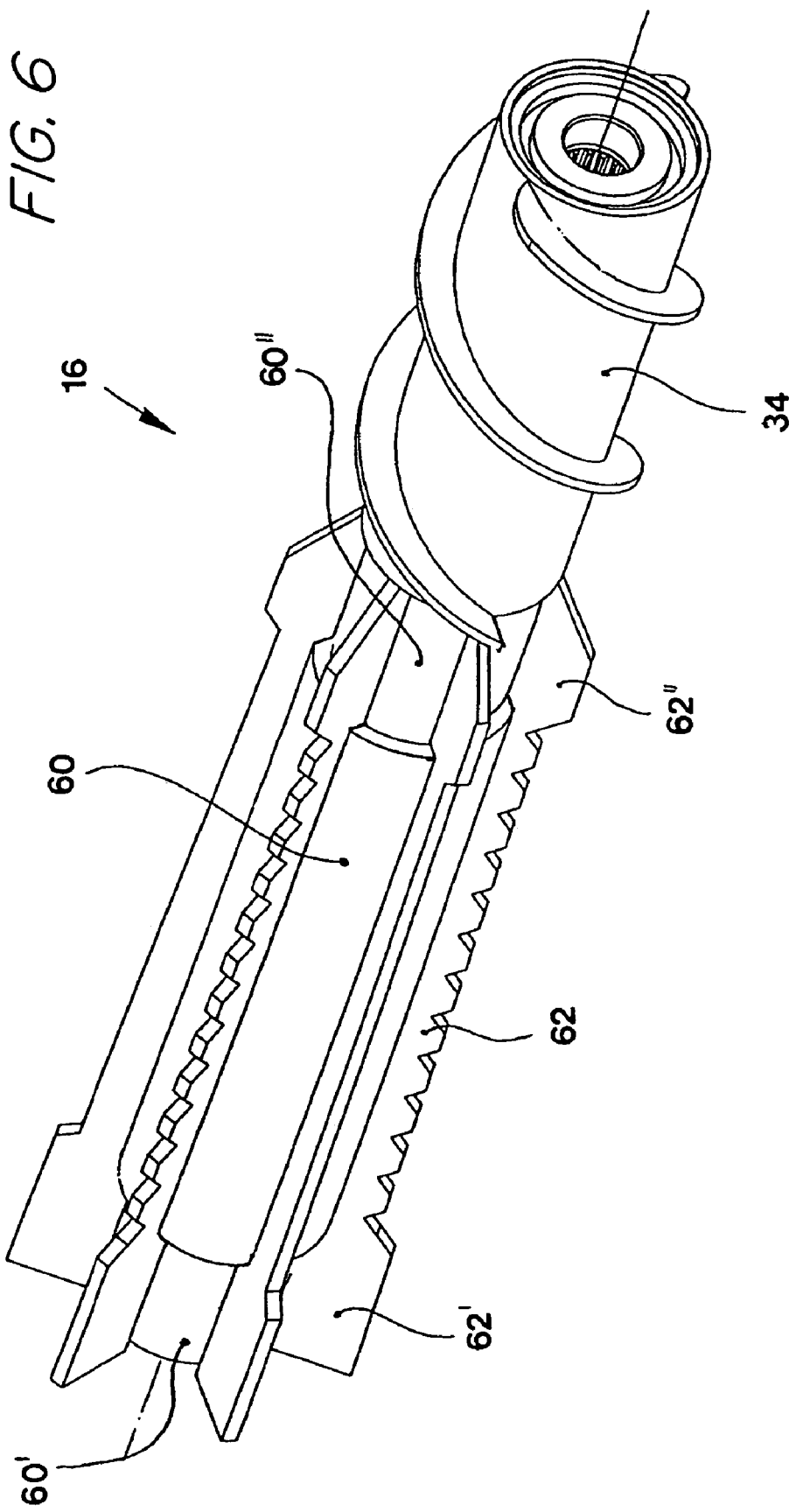
FIG. 6 is a perspective view of a second embodiment of a stalk roll.

FIG. 6 shows a perspective view of a second embodiment of a stalk roll 16 according to the invention, with a screw conveyor 34 arranged at its tip. The other stalk roll 18 is identical in structure to the stalk roll 16, but has no screw conveyor 34. The stalk roll 16 also includes a roll body 60, which, however, has a circular cylindrical middle section as well as a circular cylindrical end section 60' and a circular cylindrical initial section 60", each with a reduced diameter relative to the middle section of roll body 60. Six drivers 62 are uniformly distributed around the periphery of roll body 60. The drivers 62 are toothed in their middle region, adjacent to the middle section of the roll body 60, in order better to grasp the plants 64. This toothing can also be provided in the embodiment according to FIG. 3. In addition, the drivers 62 are also equipped with end section 62' and initial section 62", the outer edges of which describe an enveloping circle whose diameter is greater than that of the middle region of the drivers 62. In other words, the outside diameter of the drivers 62 increases in step-like fashion in the end sections 62' and 62".

The stalk rolls 16 and 18 according to this embodiment are also arranged parallel to each other, are placed in rotation with matching speeds, and the drivers 62 of the two stalk rolls 16 and 18 that are symmetrically offset at an angle to each other reach into the enveloping circle of the drivers 62 of the other stalk rolls 18 and 16. The step-like rise in outside diameter of the end section 62' and initial section 62" of drivers 62 and the step-like reduction in diameter of the end section 60' and initial section 60" of the roll body 60 make it possible for the spacing between roll body 60 of one stalk roll 16 and 18 and the drivers 62 of the other stalk roll 18 and 16 to remain constant over the length of the stalk rolls 16 and 18. However, it could also become smaller toward the downstream end of the stalk rolls 16 and 18 (which would also be conceivable in the embodiment according to FIG. 3), in order to adapt it to the upwardly diminishing diameter of the plant 64.

In the picking region of stalk rolls 16 and 18, which corresponds to the middle region of roll body 60, the plants 64 are pulled in with relatively low speed and are bent by drivers 62 only slightly in the lateral direction against the opposite roll body 60. The diameter of the drivers 62 increases in the end region 62', while whereas the end region 60' of roll body 60 has a step-like, diminished diameter. Because of this, the pull-in speed of the stalk rolls 16 and 18 rises in step-like fashion downstream of the picking region of stalk rolls 16 and 18.

The crop heads 66 of plants 64 are generally situated at a certain height above the ground. The lower parts of plants 64 are therefore pulled in more quickly in an inlet region defined by the initial sections 60" and 62" of the roll bodies 60 and drivers 62, because of the outside diameter of the drivers 62, increased there in step-like fashion, and the diameter of the roll bodies 60, reduced there in step-like fashion, than in the picking region. It would also be conceivable to linearly increase or reduce the initial and/or end sections 60', 62', 60" and 62" (i.e., configure them as truncated cones) similarly to the embodiment according to FIG. 3.

Figure 7:
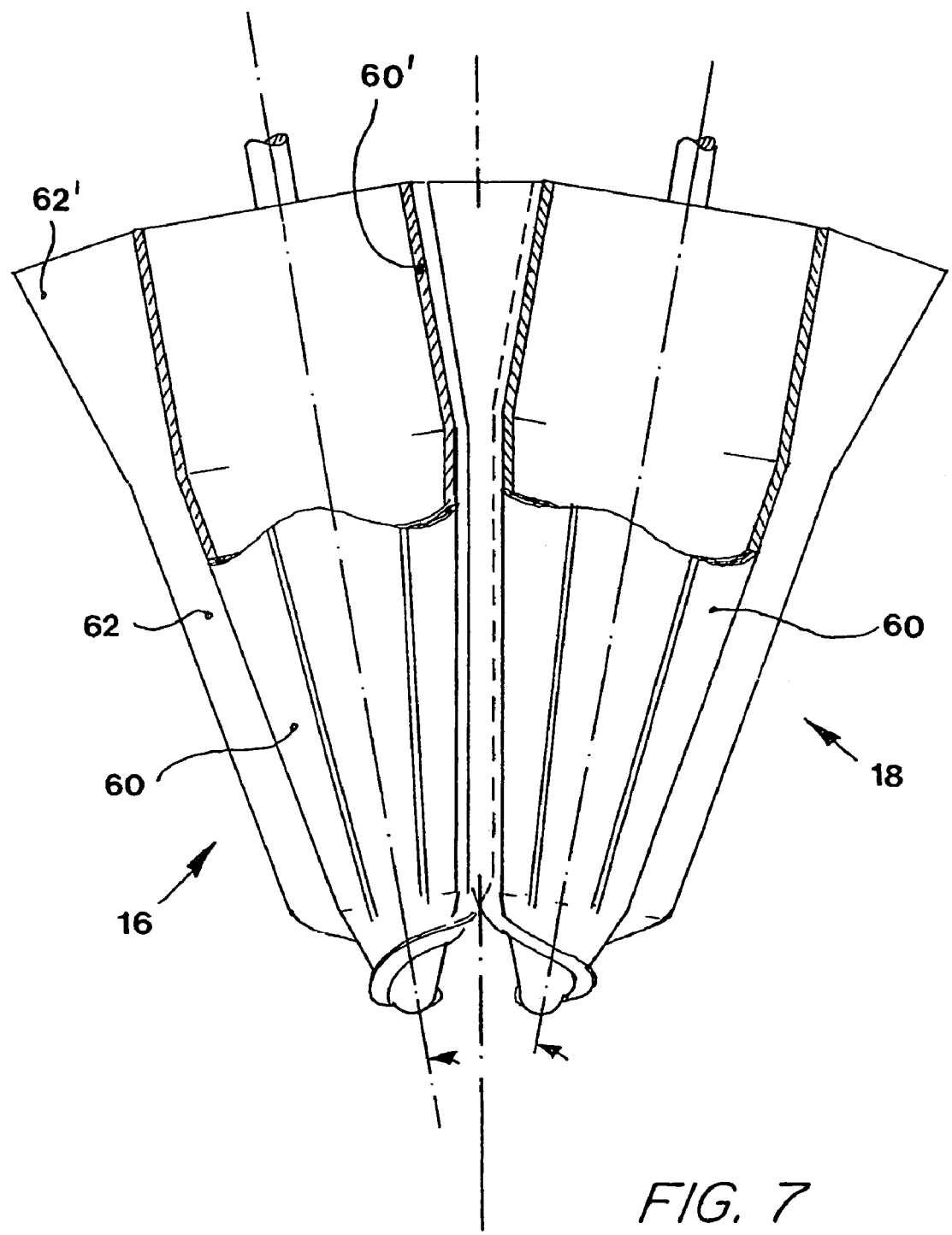
FIG. 7 is a top view of two cooperating stalk rolls according to a third embodiment of the invention.

The stalk rolls 16 and 18 can also be arranged at angles that converge in front of their tips, in order to increase the rise in pull-in speed still further in the direction of flow. This embodiment is shown in FIG. 7. The rotational axes of stalk rolls 16 and 18 each enclose an angle of about 15° with the longitudinal axis of the picking gap. Their roll bodies 60 conically expand over their picking region (i.e., the length wherein the plant parts that carry crop heads 66 are pulled into the picking gap 22) in the flow direction of the crop, which enters at the tips shown at the bottom in FIG. 7. The end sections 60' of roll bodies 60, on the other hand, are configured as circular cylinders. It would also be conceivable to configure them successively tapering inward or in step-like fashion, or to provide them with a lesser conicity than in the picking region of roll bodies 60. The drivers 62 are provided, over the conical region of roll bodies 60, such that their outer edges remain at a constant distance from the adjacent roll bodies 60 over the length of drivers 62. However, the drivers 62 have end sections 62' that widen outward in triangular fashion. The end sections 62' of drivers 62 that widen outward are therefore complementary to the end tapering sections 60' of the roll bodies 60. The gap between the drivers 62 of one stalk roll 16 and the roll bodies 60 of the other stalk roll 18 is therefore at least roughly constant over the length of the stalk rolls 16 and 18. The pull-in speed in the picking region increases linearly along the length of the stalk rolls 16 and 18, and again rises to an increased degree in the region of the stalk rolls 16 and 18 that is defined by the end sections 60' and 62'. These end sections 60' and 62' cooperate with the parts of the plants 64 above the crop heads 66. Because of this, a situation is achieved in which the picking gap 22 is quickly freed-up for the subsequent plant 64.

It should be noted that the stalk rolls 16 and 18 according to the invention are suitable not only for the described gathering and picking device 10 that operates independently of rows, but also for conventional pickers that operate with feeder chains.

Having described the illustrated embodiments, it will become apparent that various modifications can be made without departing from the scope of the invention as defined in the accompanying claims.

The invention claimed is:

1. A stalk roll for a harvesting device for harvesting a crop head from a stalk of a plant comprising:
   a roll body and a plurality of roll drivers distributed around the roll body wherein the roll drivers each have a roll driver inner edge and a roll driver outer edge and further wherein each roll driver inner edge is adjacent to the roll body and the roll drivers each project outward from the roll body;
   the roll body having a roll body front end with a roll body front diameter and a roll body rear end with a roll body rear diameter wherein during normal operation the roll body front end encounters a stalk of a plant prior to the roll body rear end and the roll body front diameter is greater than the roll body rear diameter; and
   the plurality of roll drivers each having a roll driver front end attached near the roll body front end and a roll driver rear end attached near the roll body rear end wherein the plurality of roll driver front end outer edges define a stalk roll front diameter and the plurality of roll driver rear end outer edges define a stalk roll rear diameter and further wherein the stalk roll front diameter is less than the stalk roll rear diameter.

2. A gathering and picking device for a harvesting device for harvesting a crop head from a stalk of a plant, the gathering and picking device comprising:
   a first stalk roll and a second stalk roll;
   the first stalk roll comprising a first roll body and a plurality of first roll drivers distributed around the first roll body wherein the first roll drivers each have a first roll driver inner edge and a first roll driver outer edge and further wherein each first roll driver inner edge is adjacent to the first roll body and the first roll drivers each project outward from the first roll body;
   the first roll body having a first roll body front end with a first roll body front diameter and a first roll body rear end with a first roll body rear diameter wherein during normal operation the first roll body front end encounters a stalk of a plant prior to the first roll body rear end and the first roll body front diameter is greater than the first roll body rear diameter;
   the plurality of first roll drivers each having a first roll driver front end attached near the first roll body front end and a first roll driver rear end attached near the first roll body rear end wherein the plurality of first roll driver front end outer edges define a first stalk roll front diameter and the plurality of first roll driver rear end outer edges define a first stalk roll rear diameter and further wherein the first stalk roll front diameter is less than the first stalk roll rear diameter;
   the second stalk roll comprising a second roll body and a plurality of second roll drivers distributed around the second roll body wherein the second roll drivers each have a second roll driver inner edge and a second roll driver outer edge and further wherein each second roll driver inner edge is adjacent to the second roll body and the second roll drivers each project outward from the second roll body;
   the second roll body having a second roll body front end with a second roll body front diameter and a second roll body rear end with a second roll body rear diameter wherein during normal operation the second roll body front end encounters a stalk of a plant prior to the second roll body rear end and the second roll body front diameter is greater than the second roll body rear diameter; and
   the plurality of second roll drivers each having a second roll driver front end attached near the second roll body front end and a second roll driver rear end attached near the second roll body rear end wherein the plurality of second roll driver front end outer edges define a second stalk roll front diameter and the plurality of second roll driver rear end outer edges define a second stalk roll rear diameter and further wherein the second stalk roll front diameter end is less than the second stalk roll rear diameter.

3. The gathering and picking device of claim 2 wherein the first stalk roll further comprises a first stalk roll axis.

4. The gathering and picking device of claim 3 wherein the second stalk roll further comprises a second stalk roll axis.

5. The gathering and picking device of claim 4 wherein the first stalk roll axis and the second stalk roll axis are parallel to each other.

6. The gathering and picking device of claim 2 further comprising a gap defined by the first roll body and one of the plurality of second roll driver outer edges when the one of the plurality of second roll driver outer edges is adjacent to the first roll body wherein the gap is approximately of constant width from the first roll body front end to the first roll body rear end.

7. A gathering and picking device for a harvesting device for harvesting a crop head from a stalk of a plant, the gathering and picking device comprising:
   a first stalk roll having a first stalk roll axis, and a second stalk roll having a second stalk roll axis, wherein the first stalk roll axis and the second stalk roll axis are parallel to each other;
   the first stalk roll comprising a first roll body and a plurality of first roll drivers distributed around the first roll body wherein the first roll drivers each have a first roll driver inner edge and a first roll driver outer edge and further wherein each first roll driver inner edge is adjacent to the first roll body and the first roll drivers each project outward from the first roll body;
   the first roll body having a first roll body front end with a first roll body front diameter and a first roll body rear end with a first roll body rear diameter wherein during normal operation the first roll body front end encounters a stalk of a plant prior to the first roll body rear end and the first roll body front diameter is greater than the first roll body rear diameter;
   the plurality of first roll drivers each having a first roll driver front end attached near the first roll body front end and a first roll driver rear end attached near the first roll body rear end wherein the plurality of first roll driver front end outer edges define a first stalk roll front diameter and the plurality of first roll driver rear end outer edges define a first stalk roll rear diameter and further wherein the first stalk roll front diameter is less than the first stalk roll rear diameter;
   the second stalk roll comprising a second roll body and a plurality of second roll drivers distributed around the second roll body wherein the second roll drivers each have a second roll driver inner edge and a second roll driver outer edge and further wherein each second roll driver inner edge is adjacent to the second roll body and the second roll drivers each project outward from the second roll body;
   the second roll body having a second roll body front end with a second roll body front diameter and a second roll body rear end with a second roll body rear diameter wherein during normal operation the second roll body front end encounters a stalk of a plant prior to the second roll body rear end and the second roll body front diameter is greater than the second roll body rear diameter;

the plurality of second roll drivers each having a second roll driver front end attached near the second roll body front end and a second roll driver rear end attached near the second roll body rear end wherein the plurality of second roll driver front end outer edges define a second stalk roll front diameter and the plurality of second roll driver rear end outer edges define a second stalk roll rear diameter and further wherein the second stalk roll front diameter end is less than the second stalk roll rear diameter; and a gap defined by the first roll body and one of the plurality of second roll driver outer edges when the one of the plurality of second roll driver outer edges is adjacent to the first roll body wherein the gap is approximately of constant width from the first roll body front end to the first roll body rear end.

* * * * *